Sept. 23, 1969     W. G. NEWMAN ET AL     3,468,146
BAR SCREW STRAIGHTENER
Filed Feb. 2, 1967     3 Sheets-Sheet 1
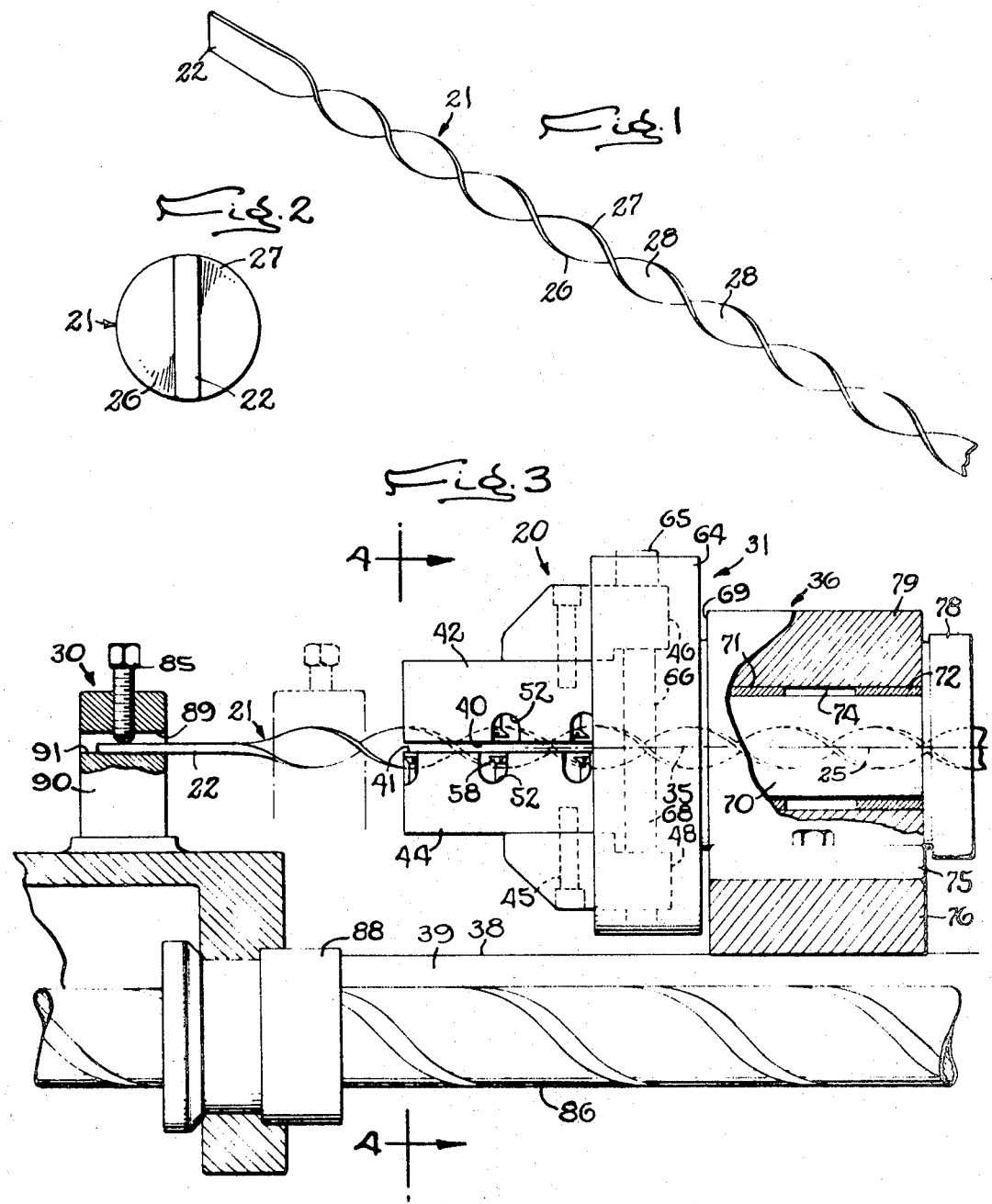

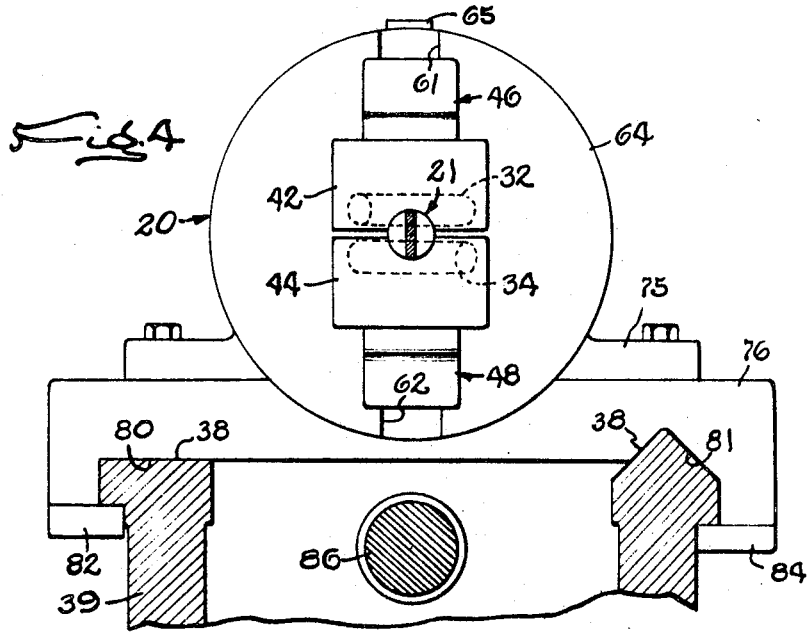
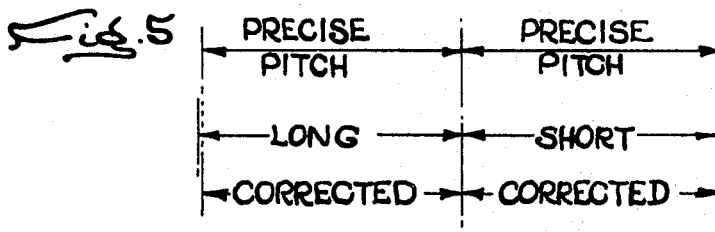
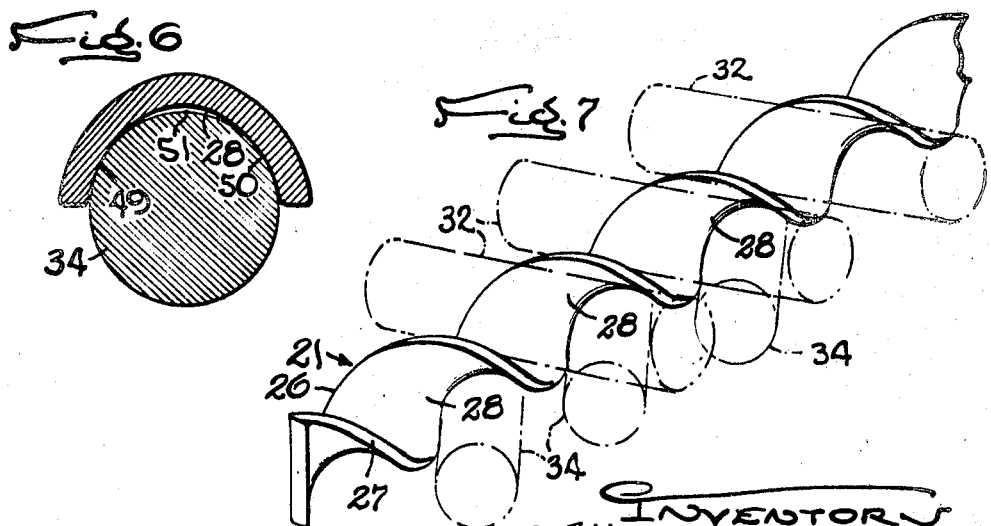

Sept. 23, 1969 W. G. NEWMAN ET AL 3,468,146
BAR SCREW STRAIGHTENER
Filed Feb. 2, 1967 3 Sheets-Sheet 3
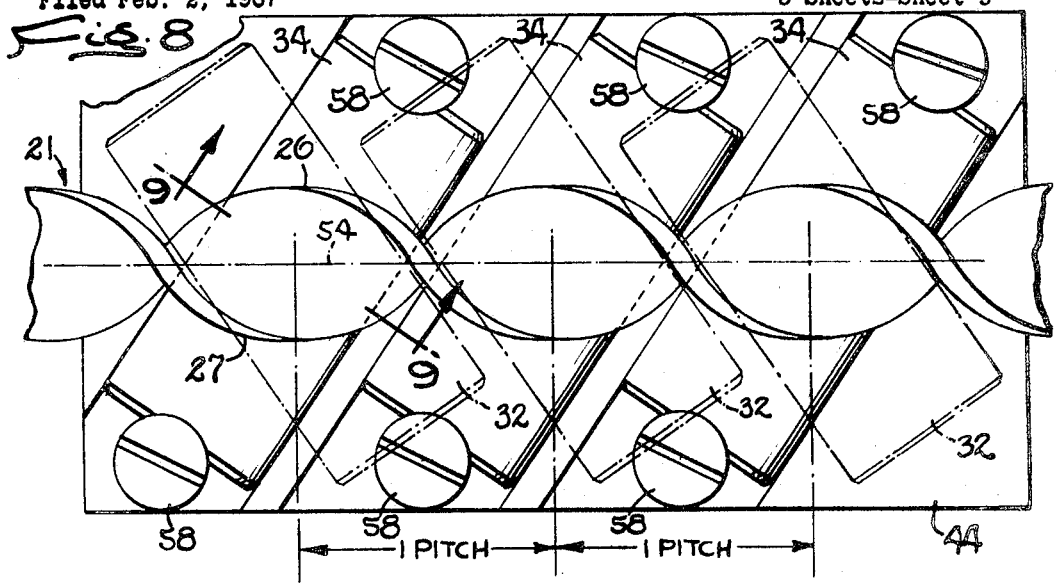
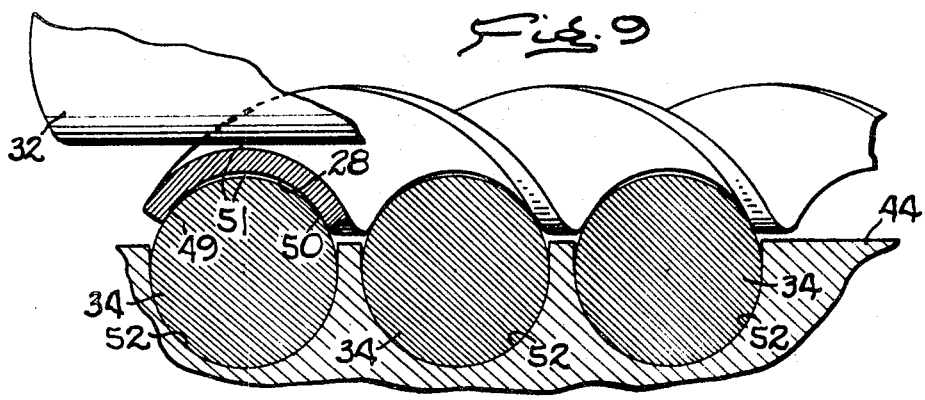
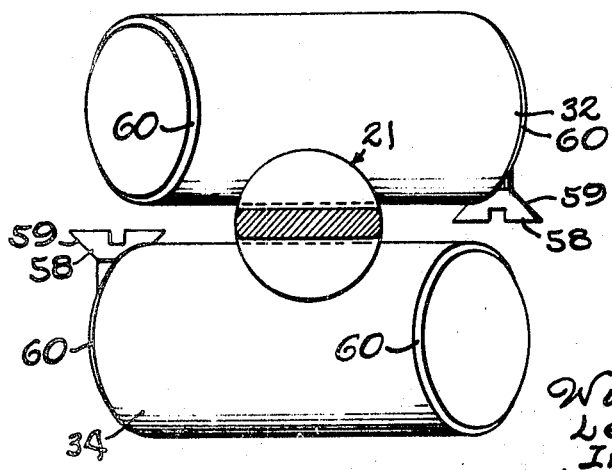
INVENTORS
William G. Newman
Leo F. Doran
Irving J. Ezyk
by Wolfe, Hubbard, Voit & Osann
ATTORNEYS 3,468,146
BAR SCREW STRAIGHTENER
William G. Newman, Oak Park, Leo F. Doran, Clawson, and Irving J. Ezyk, Utica, Mich., assignors to Beaver Precision Products, Inc., Clawson, Mich., a corporation of Delaware
Filed Feb. 2, 1967, Ser. No. 613,670
Int. Cl. B21d 3/02, 3/16, 11/14
U.S. Cl. 72—64          11 Claims

ABSTRACT OF THE DISCLOSURE

Apparatus for correcting the lead of a previously formed bar screw wherein the screw is drawn through two pairs of opposed rollers with the rollers inclined relative to the screw at an angle equal to the desired helix angle of the screw and the spacing of one pair of rollers equal to the desired pitch distance of the screw thread.

---

This invention relates to apparatus for making slight lead corrections and straightening bar screws which are spiral screws formed by twisting a bar with relatively uniform turns. While the bar screws are eminently satisfactory for many uses without straightening or correction, certain applications, such as lead screws in precision positioning mechanisms, require a very precise lead not usually obtainable with bar screws produced at high rates of production.

Accordingly, the general object of the invention is to correct slight deviations in the pitch of such bar screws and to straighten the axis of bar screws in a manner effective to form a more precise bar screw capable of use with precision positioning mechanisms.

A more specific object of the invention is to advance a bar screw through opposed forming rolls which are spaced at the exact lead and helix angle and to force the thread form of the screw to stretch or to compress to the exact lead as it progresses through the forming rolls.

A more specific object of the invention is to straighten the axis of a bar screw by advancing the bar screw through opposed lines of forming rolls spaced equidistant from a common centerline and forcing the axis of the screw to coincide with this centerline thereby removing any curvature in the axis of the screw.

The invention also resides in an apparatus for correcting deviations in bar screws including a rotating chuck having opposed jaws each with forming rolls spaced at the pitch distance and at the helix angle for threading through the screw as it is pulled axially through the rotating chuck.

Other objects and advantages of the invention will become apparent from the following detailed description taken in connection with the accompanying drawings, in which FIGURE 1 is a perspective view of a bar screw of the kind which is to be corrected with the present invention.

FIG. 2 is an end view of the bar screw of FIG. 1.

FIG. 3 is a partial sectional view of exemplary apparatus for straightening bar screws in accordance with the invention.

FIG. 4 is a sectional view taken substantially along the line 4—4 of FIG. 3 showing angular relationship of the former rolls in the rotatable chuck to the bar screw.

FIG. 5 is a diagram of the correction of the pitch of the bar screw to the precise pitch.

FIG. 6 is a sectional view of the bar screw on a former roll.

FIG. 7 is a schematic perspective view of the three pairs of opposed former rollers engaging a bar screw.

FIG. 8 is a plan of the three pairs of former rollers engaging a bar screw.

FIG. 9 is a sectional view taken substantially along the line 9—9 of FIG. 8.

FIG. 10 is an end view of a bar screw and showing the angular relationship of the former rollers to the axis of the bar screw.

In the drawings, the invention is shown for purposes of illustration incorporated in an apparatus 20 (FIG. 3) for straightening a spiral screw 21 (FIG. 1) which herein is a bar screw formed by twisting an elongated bar of rectangular cross-section into a spiral between the opposite ends 22 and 24 of bar. The preferred method of and apparatus for twisting bars into positioning screws are described in copending application of William G. Newman, Leo F. Doran and Irving J. Ezyk, Ser. No. 613,669, filed of even date, entitled "Method of and Apparatus for Forming Bar Screws." For the rectangular cross-section bar screw, the pitch is one half of the lead and, hence, for each revolution of the bar screw, a lead nut (not shown) traverses along two threads. Bar screws produced according to the method of the above application are eminently satisfactory for many applications, but for precise positioning apparatus it is desired to assure that the lead of the bar screw be quite precise. For instance, bar screws with a pitch tolerance of about .004 or .005 of an inch may be corrected to have a tolerance of about .001 or .002 of an inch. Also, the bar screws may have a slight curvature along the axis 25 and it is desired, in many instances, that the axis be straightened to approach a theoretical straight line axis throughout the length of the thread form.

Herein, the bar screw is a double start thread in that it has two sides and threads 26 and 27, as best seen in FIG. 2, rather than a single thread as in many of the spiral screws formed by machining round bar stock. While the flat, non-twisted ends 22 of the bar screw may be severed to leave only the intermediate thread, in many instances the flat ends are not severed and remain to prevent the threading of one end of the bar screw into a nut or the like, if such were attempted to be used as a straightener. Thus, the bar screw does not lend itself to correction and straightening by conventional methods employed with other kinds of spiral screws which lack the flat ends.

In accordance with the present invention, the bar screw 21 is corrected to the precise lead and the axis of the bar screw is straightened by clamping one end of the bar screw in a carriage 30 and advancing the threaded form of the screw through a rotatable support 31, such as a rotatable chuck, having opposite pairs of opposed forming rolls 32 and 34, which are set at the correct helix angle and the correct pitch, and which compress or stretch the thread form on the screw to correct the pitch of the thread form as it progresses through the former rollers rotating about the screw. The axis 25 of the bar screw is straightened because the pairs of former rollers are spaced radially and equidistantly from the axis 35 of the chuck and because the rollers force the passing portion of the screw to deform to coincide with the chuck axis thereby removing any curvature along the longitudinal length of the screw.

With the advancing of the bar screw through the pairs of forming rolls 32 and 34, the latter are carried in a conventional rotatable chuck 31 which is journaled in an upstanding support 36 fixed to longitudinally extending, spaced slideways 38 of a stationary base 39. The forming rolls are secured on the radially inward faces 40 and 41 (FIG. 3) on mounting blocks 42 and 44 bolted by radially directed bolts 45 to radially slidable chuck jaws 46 and 48 disposed in the chuck on opposite sides of the screw.

Herein, the forming rolls are solid cylinders made of hardened metal having a diameter and exterior surface which is identical to that of a lead nut (not shown) or the balls (not shown) of a ball nut for following the spiral surfaces 28 in the grooves of the screw. The forming rolls fit into the spiral grooves to engage the respective thread forms at arcuately spaced points 49 and 50 (FIGS. 6 and 9) on the flank of the grooves and are spaced from the roots of the groove to leave gaps 51 between the root of the groove and the adjacent surface on the forming rolls. Thus, the forming rolls engage the flanks of the spiral groove at the same location as will the balls (not shown) of a ball nut which, according to conventional and preferred practice, also do not bottom in the spiral grooves.

The correct helix angle for the screw is calculated and the forming rolls 32 and 34 are secured in the respective opposite mounting blocks 42 and 44 at this helix angle. Although there are two threads 26 and 27 on the bar screw 20, their respective helix angles are identical. The forming rolls are aligned at the helix by being seated in grooves 52 which are machined in the outer face of each mounting block at the precise acute helix angle to the longitudinal centerline 54 (FIG. 8) of the blocks. The sides of the grooves are rounded to be complementary in diameter to the rolls and are generally semi-circular in cross-section to confine and back up at least one-half of each roll seated therein in order to withstand the large forces needed to deform the screw form to change its pitch to the precisely desired pitch. To hold the rolls against sliding longitudinally in the grooves, screws 58 are abutted against the opposite ends of each of the rolls and are threaded into the mounting block. The inclined sides 59 (FIG. 10) of the heads of the screws overlie a chamfered end 60 on each of the rolls to retain the rolls in the grooves while permitting the rollers to rotate in the grooves thereby reducing friction and distributing wear evenly about the circumference of a roller.

To assist in straightening any curvature in the axis of the screw, the rolls are located equidistant from the axis 35 of the chuck. The axis of the three rolls 32 on the block 42 define a plane which is parallel to the centerline 35 of the chuck, and likewise the axes the three rolls 34 on the mounting block 44 define a plane parallel to the centerline through the chuck. Therefore, the three rolls on each side of the chuck axis force the axis of the portion of the screw threaded between the three pairs of rollers to coincide with the axis of the chuck. As the screw progressively advances through the chuck, the trailing portions of the screw are straightened to eliminate any curvature throughout the length of the screw.

In order to separate the chuck jaws 46 and 48 to insert a bar screw between the forming rollers and to clamp the forming rollers tightly on the screw, the jaws are slidably mounted for radial sliding toward one another in radial channels 61 and 62 (FIG. 4) in the face of an annular block 64. An adjusting screw 65 is secured in the block and has right and left hand threaded portions 66 and 68 (FIG. 3) threaded into the respective clamping jaws 46 and 48 to move them simultaneously through identical distances and in the same radial direction toward or away from the axis 35 with turning of the screw 65. Thus, the jaws always are centered with respect to one another and thereby maintain the forming rolls 32 and 34 centered with respect to the centerline 35 through the chuck.

In order to journal the chuck for rotation in the support 36 fixed to the slideways 38 on the base, the annular chuck block 64 is secured at one end to an annular collar 69 which in turn is fixed to the forward end of a longitudinal hollow sleeve 70 journaled in bushings 71 and 72 fitted in the hollow longitudinal bore 74 of a pedestal mounting plate 75 (FIG. 4) upstanding from and bolted to a support plate 76 spanning the slideways 38. The axis of the sleeve is coincident with the centerline 35 through the chuck jaws and the sleeve 70 is free to rotate in the annular bushings about this axis. The sleeve is held against longitudinal movement relative to the pedestal between the front thrust collar 69 on the forward end of the sleeve and a rear annular thrust collar 78 which is fixed on the rear end of the sleeve and engages the vertical rear wall 79 of the pedestal. Thus, the thrust collars 69 and 78 are fixed to the sleeve to engage the opposite vertical walls of the pedestal and hold the chuck against axial movement relative to the pedestal.

To hold the chuck support against sliding axially along the slideways 38 (FIG. 4) during a straightening operation, the lower support plate 76 is clamped to the slideways 38 of the machine base. To this end, the plate 76 extends horizontally and transversely of the slideways and rests thereon on matching slideway surfaces 80 and 81 and the outer ends of the support plate extend downward along the slideways and attached bars 82 and 84 are clamped by screws against longitudinal shoulders on the respective slideways. Thus the bars 82 and 84 hold the support plate and chuck against lifting and turning on the base during the straightening and correctiong of a screw.

To advance the bar screw 20 through the forming rolls 32 and 34 and along a rectilinear path, the flat end 22 of the screw is clamped by a set screw 85 to the carriage 30 which slides along the slideways 38 with the turning of a spiral feed screw 86 in a ball nut 88 fixed to the underside of the carriage. The carriage is preferably the tailstock of a lathe-like machine and herein is the same tailstock used for forming the twisted bar screws according to the method disclosed in the above identified application. In practice, one bar is being twisted into a bar screw with advance of a bar (not shown) secured at the left end of the tailstock 30, while a previously formed bar screw 21 secured to the right end of the tailstock is being straightened with advance of the same tailstock 30 leftwardly from an initial position shown in dotted lines in FIG. 3.

To grip the flat end 22 of the bar screw 21, the lower end of the set screw 85 extends into a horizontal slot 89 provided in an upstanding block 90 fixed to the upper surface of the carriage 30. By tightening the set screw against the upper surface of the bar screw, the latter is clamped against the bottom wall 91 of the slot with the flat end of bar screw horizontally disposed. The slot is centered over the feed screw 86 and is centered between the slideways to be coaxial with the rotatable chuck. Therefore, the bar screw 21 is pulled along a straight line path as the carriage advances.

As can best be appreciated from FIGS. 7 and 10, the top forming rolls 32 are disposed crosswise over the lower forming rolls 34. Vertical planes through the axis of each of the top rolls intersect similar vertical planes through the axis of the respective lower rollers at points spaced axially along the centerline of the chuck. Each upper roll and its lower crosswise roll constitute spaced wedge surfaces having a wedge point at the axis 35 of the chuck. The forming rolls ride on the flanks of the screw at the points 49 and 50 and burnish the flanks along these points by rubbing metal to metal contact between the screw and the hardened rolls. As the chuck rotates about the axially moving bar screw, the forming rolls push on the entering threads of the screw, which is of relatively thin, rectangular cross-section and deform the screw metal to fit between the rolls which are at the correct pitch. Thus, as illustrated in FIG. 5 threads which are too long are compressed between the rollers to the more precise pitch between the rollers and threads which are too short are expanded between the rollers to the more precise pitch.

In operation, the screw is loaded in the chuck with the jaws 42 and 44 tightened to center the screw between the rollers. The set screw 85 grips the flat end 22 of the screw and the carriage is advanced leftwardly (FIG. 3) to pull the bar screw leftwardly through the rotatable chuck to progressively straighten the right hand portion of the screw. The feed screw 86 herein turns at a predetermined rate which is equal to the lead of the screw so that the chuck partakes of one complete revolution with the feeding of the carriage through the lead distance.

In this manner, the carriage pulls the lead screw through the forming rolls until reaching the flat end 24 of the bar screw. Then, after stopping the carriage advance, the adjusting screw 65 is turned to slide the clamping jaws 46 and 48 radially outward to separate the form rollers from the screw. After loosening the set screw 85, the flat end 22 is slipped from the slot 89 and the screw is pulled endwise through and from the chuck. After reversing the carriage to the dotted line position, a new bar screw is clamped by the set screw and the adjusting screw is turned to force the forming rolls against the threads as seen in FIGS. 9 and 10. With the bar screw loaded, the straightening apparatus is ready for a new cycle upon the advancing of the carriage 30.

From the foregoing, it will be seen that the present apparatus affords an efficacious straightening and correcting of the lead of bar screws to bring them within tolerance limits acceptable for precision adjusting mechanisms. Moreover, the apparatus can be used to straighten double start screws having flat, non-twisted ends 22 and 24.

I claim as my invention:

1. In an apparatus for correcting the lead of a spiral screw twisted from a bar to conform the lead to a preselected helix angle, the combination of, a base, a support mounted on the base through which said screw is moved axially along a predetermined path, opposed forming rollers mounted in said support at said preselected helix angle of the screw thread and disposed on opposite sides of the screw to fit into and to engage adjacent screw threads, at least two rollers being provided on each side of the screw and being spaced axially from each other at the pitch distance for the screw thread, and means to thread the screw through the rollers and along the predetermined axial path with the rollers engaging and deforming those threads deviating from the correct pitch as the screw threads through the rollers.

2. The apparatus of claim 1 in which the support is fixed on the base and includes a rotatable member carrying the opposed rollers for rotating about the screw as the latter is threaded through the rollers.

3. The apparatus of claim 2 in which said rotatable member includes a pair of slidable jaws movable radially toward and from the axis of screw to shift the rollers into and from engagement with the screw thread.

4. The apparatus of claim 3 in which the rotatable member is a rotatable, self-centering chuck with the slidable jaws and further including an adjusting screw to move said jaws toward and from each other through equal distances with turning of the adjusting screw.

5. The apparatus of claim 1 in which the forming rollers are cylindrically shaped of a preselected diameter to fit against the flanks of a screw thread, and in which mounting blocks are provided on said support for holding said rollers at said helix angle and said pitch spacing while permitting said rollers to turn in said mounting blocks to reduce the friction present when the rollers rub on the screw threads.

6. The apparatus of claim 5 in which the mounting blocks have a plurality of parallel grooves extending at the helix angle to the screw, rounded surfaces in said grooves complementary in diameter to the diameter of the rollers to hold said cylinders against the forces encountered during a correction of a screw thread.

7. The apparatus of claim 1 in which said rollers on one side of the screw have their axes alined into a plane parallel to a plane through the axes of the rollers on opposite sides of the screw, axis of the screw being forced to a position centrally between and parallel to said planes.

8. The apparatus of claim 1 in which the rollers on one side of the screw are disposed crosswise to the rollers on the other side of the screw to form a converging acute angle so that rollers squeeze the threads to the proper pitch.

9. In an apparatus for correcting the lead of a spiral screw formed from a twisted bar, the combination comprising, a base, a carriage on said base for connection to said screw and for advancing said screw axially along a path, a support, fixed to said base, a pair of opposed jaws mounted on said support for moving toward the axis of said screw, forming pins secured to each jaw and disposed at the helix angle to the axis of the screw, said forming pins on each jaw spaced apart longitudinally at the helix angle to the axis of the screw, said forming pins on each jaw spaced apart longitudinally at the pitch distance and having a rounded surface to fit in a thread of the screw, and means journaling said jaws for rotation in said support so that the forming pins turn and thread through the groove forcing the threads to the proper lead as the carriage advances the lead screw through the support.

10. In an apparatus for correcting the pitch of a spiral thread of a screw twisted intermediate the ends of a bar, the combination comprising, a base, a carriage driven along a predetermined path on the base, a clamp on the carriage for clamping one end of the bar and holding the bar against twisting while moving the bar along the predetermined path, spaced formers for engaging adjacent threads on one side of the spiral groove, spaced formers for engaging adjacent threads on the other side of the spiral groove, each of said formers being spaced apart at the pitch distance and at the helix angle for engaging in the adjacent turns of the screw, and support means fixed to said base and journaling said formers for rotation about the screw traversing through the formers, said formers permanently deforming the screw threads to assume the pitch therebetween as the bar is threaded through the rotating formers.

11. In an apparatus for correcting the lead of a spiral screw and for straightening its axis, the combination of, a base, a rotatable chuck mounted on the base and having opposed jaws adapted to receive a screw therebetween and movable toward and from the screw, cylindrical formers mounted on the radially inner face on one jaw and spaced from each other at a pitch distance and at a helix angle for the screw being corrected, cylindrical formers mounted on the radially inner face of the other jaw and spaced from each other at a pitch distance and at a helix angle for the screw being corrected, said cylindrical formers on the opposed jaws disposed crosswise relative to one another to form a converging acute angle therebetween, and a carriage for advancing the screw through said cylindrical formers so that the rollers squeeze the threads to the proper pitch.

References Cited

UNITED STATES PATENTS

| | | | |
|---|---|---|---|
| 569,087 | 10/1896 | Burnham | 72—78 |
| 1,463,594 | 7/1923 | Rust | 72—64 |
| 2,494,689 | 1/1950 | Canfield et al. | 72—64 |
| 3,222,908 | 12/1965 | Molella | 72—64 |

RICHARD J. HERBST, Primary Examiner

U.S. Cl. X.R.

72—78, 100